United States Patent

Korus

[11] Patent Number: 6,144,673
[45] Date of Patent: Nov. 7, 2000

[54] METHOD AND APPARATUS FOR PROVIDING BROADCAST GROUP DATA

[75] Inventor: Michael Korus, Hoffman Estates, Ill.

[73] Assignee: Motorola, Inc., Schaumburg, Ill.

[21] Appl. No.: 08/957,095

[22] Filed: Oct. 24, 1997

[51] Int. Cl.$^7$ ............................... H04L 12/28; H04J 3/26
[52] U.S. Cl. ........................................... 370/432; 370/397
[58] Field of Search ..................................... 370/432, 400, 370/451, 403, 396, 397, 402; 375/377; 379/220

[56] References Cited

U.S. PATENT DOCUMENTS

| | | | |
|---|---|---|---|
| 4,998,245 | 3/1991 | Tamaka et al. | 370/432 |
| 5,473,642 | 12/1995 | Osawa et al. | 375/377 |
| 5,636,216 | 6/1997 | Fox et al. | 370/402 |
| 6,011,844 | 1/2000 | Uppaluru et al. | 379/220 |

*Primary Examiner*—Chi H. Pham
*Assistant Examiner*—Brenda H. Pham
*Attorney, Agent, or Firm*—Christopher P. Moreno; Susan L. Lukasik

[57] ABSTRACT

A method and apparatus for providing broadcast group data within a communication system begins when a subscriber unit (28–32, 38–42) provides a data service message to a data gateway (12). The data service message includes identity of a subscriber unit, a data selection, and identity of at least one targeted host (e.g., a computer that stores the requested data) (22–26). Upon receiving the data service message, the data gateway (12) interprets it to determine whether the request is for an individual data broadcast or group data broadcast. When the data broadcast is for a group data broadcast, the data gateway temporarily stores the identity of the subscriber unit and the identity of the targeted host. Having done this, the data gateway (12) obtains the data from the targeted host and provides it to the requesting subscriber unit and other subscriber units that are currently involved in a group voice call with the requesting subscriber unit.

17 Claims, 4 Drawing Sheets

6,144,673

METHOD AND APPARATUS FOR PROVIDING BROADCAST GROUP DATA

TECHNICAL FIELD OF THE INVENTION

This invention relates generally to data communications and more particularly to broadcast group data communications within a communications system.

BACKGROUND OF THE INVENTION

Communication systems are known to include controlling infrastructure and end-users, or subscriber units. The controlling infrastructure may be a wire-line controlling infrastructure such as a local area network, a wide area network, the public switching telephone network (PSTN), the Internet, etc. In a wireline system, subscriber units are personal computers, workstations, personal agents, and any other telephone devices, facsimile machines, etc. Alternatively, the controlling infrastructure may be for a wireless communications system wherein the controlling infrastructure includes a zone controller or system controller, site controllers or base station controllers, base stations, and a plurality of communication channels. In a wireless system, the subscriber units may be land mobile radios, cellular telephones, pagers, personal computers equipped with wireless transceivers, and personal digital assistants equipped with wireless transceivers.

In a wireless system, which may be a digital system or analog system, the subscriber units may transceive voice information and or data information. To transceive voice information, an initiating subscriber unit transmits an inbound signaling word (ISW) to the controlling wireless infrastructure, wherein the ISW is requesting access to a voice channel. The request may be for a one-to-one communication, such as a typical telephone call, or a one-to-many communication such as a group call. Upon receiving the inbound signaling word, the controlling wireless infrastructure determines whether the requesting subscriber unit is authorized to make such a request and whether the request can be accommodated. To determine whether the requesting subscriber unit is authorized to make the particular request, the controlling infrastructure accesses a home location register (HLR) to determine which services the requesting subscriber unit has subscribed to. If the HLR indicates that the requesting subscriber unit is authorized to make such a request, the request will be granted. To determine whether the request can be fulfilled, the controlling wireless infrastructure determines whether a wireless communication channel is available in the site of the requesting subscriber unit. The wireless controlling infrastructure also determines whether communication channels are available in other sites in which targeted subscriber units (i.e., subscriber units that are identified as a recipient of the communication) are located.

If a subscriber unit involved in a digital voice communication desires to request data, the subscriber unit must leave any voice communication it is involved in (i.e., de-affiliate from the voice channel supporting the voice communication) and return to the control channel. Once affiliated with the control channel, the subscriber unit transmits an inbound signaling word requesting the data. If the request is to be fulfilled, the subscriber unit receives, via the control channel, an outbound signaling word, which indicates a data channel. The subscriber unit then affiliates with the data channel to receive the requested data. While the subscriber unit is awaiting its data request to be fulfilled, it misses potentially vital information because it is no longer affiliated with the voice communication.

For example, assume that a group of police officers are involved in a group communication responding to an emergency situation. Based on the facts surrounding the emergency situation, one of the officers involved desires additional data that needs to be shared with the group of officers involved in the emergency situation. To obtain this data, the requesting subscriber unit operated by the police officer would have to disengage from the voice channel, return to the control channel to request the data and then affiliate with a data channel to receive the data. Since only the requesting officer would receive the data, the officer must return to the talk group channel and verbally communicate the received data.

Therefore, a need exists for a method and apparatus that allows subscriber units to request and receive data for itself and or for its group without having to leave a voice communication.

DETAILED DESCRIPTION OF A PREFERRED EMBODIMENT

Generally, the present invention provides a method and apparatus for providing broadcast group data within a communication system. This begins when a subscriber unit provides a data service message to a data gateway. The data service message includes identity of a subscriber unit, a data selection, and identity of a targeted host (e.g., the computer that stores the requested data). Upon receiving the data service message, the data gateway interprets it to determine whether the data selection is for an individual data broadcast or group data broadcast. When the data service message is for a group data broadcast, the data gateway temporarily stores the identity of the subscriber unit and the identity of the targeted host. Having done this, anytime the data gateway receives data destined for the subscriber unit (while it is involved in voice communication), the data gateway forwards the data to the subscriber unit and other subscriber units that are currently involved in a group voice call with the requesting subscriber unit. With such a method and apparatus, a subscriber unit may request data for itself and or for its group without having to de-register from the voice channel, affiliate itself with the control channel, and then affiliate with a data channel.

Figure 1:
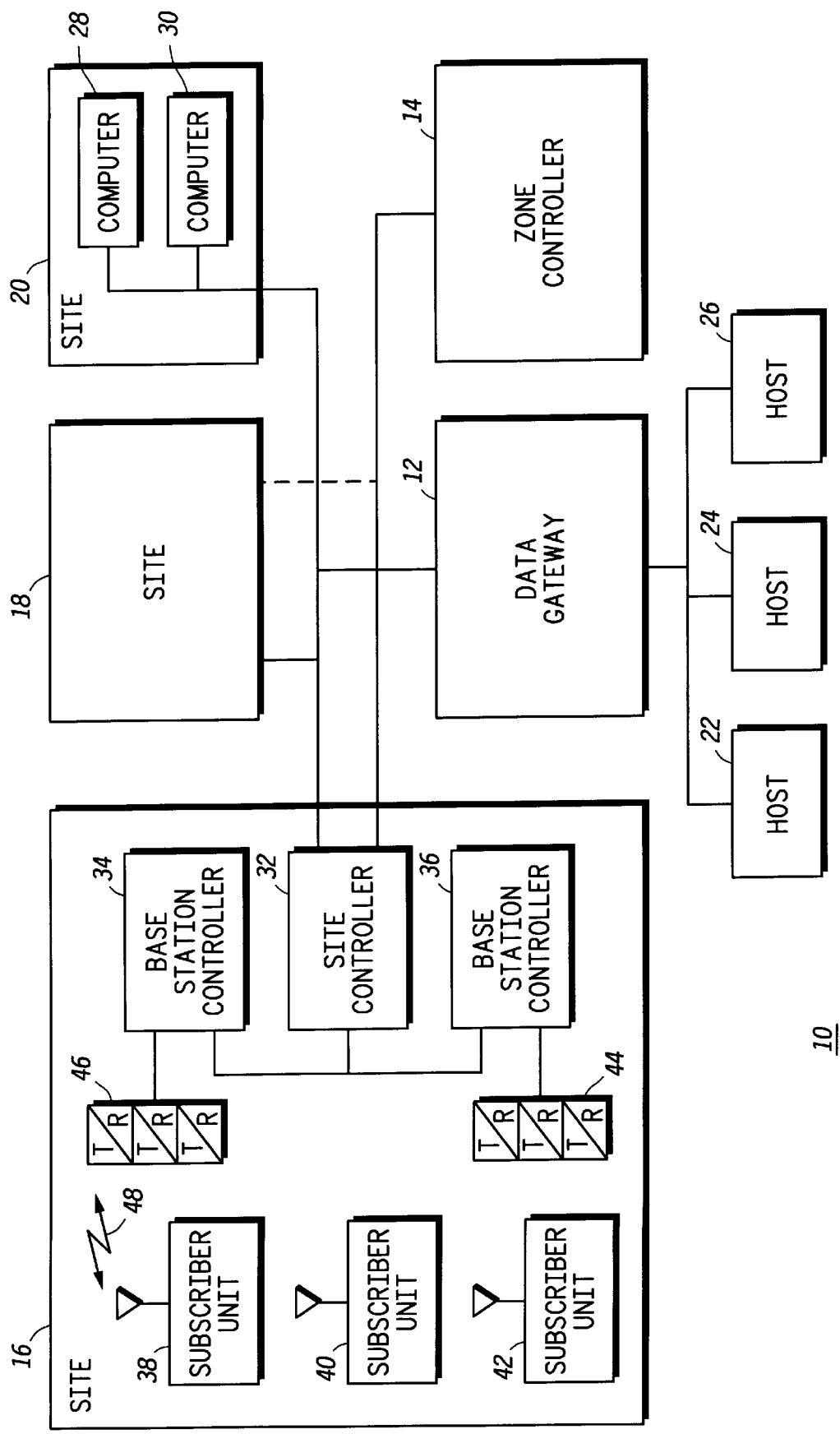
FIG. 1 illustrates a block diagram of a communications system in accordance with the present invention.

The present invention can be more fully described with reference to FIGS. 1 through 4. FIG. 1 illustrates a block diagram of a communications system 10 that includes a data gateway 12, a zone controller 14, a plurality of sites 16–20, and a plurality of host computers 22–26. The site identified by reference numeral 16 is shown as a wireless communications site that includes a site controller 32, a plurality of base stations 34, 36, a plurality of wireless communications channels 44, 46, and a plurality of subscriber units 38–42. The subscriber units 38–42 may be mobile portable radios, pagers, personal digital assistants with an RF (radio frequency) transceiver, personal computers with an RF transceiver, cell telephones, or any other device that can transceive information via an RF transmission path 48.

Preferably, each of the subscriber units 38–42 has an individual Internet Protocol (IP) address such that it can communicate, via the data gateway, with the host computers 22–26 to obtain data. However, it is understood that other addressing schemes could also be used. To make a request for data while involved in a voice communication channel, the subscriber unit selects whether the data responses from the targeted host should be sent to the requesting subscriber unit or to the group of subscriber units involved in voice communication. This selection results in the creation of a data service message that contains the requesting subscribers ID (e.g., an Internet Protocol (IP) address), the targeted host's ID, and an indication of individual or group response, which is transmitted over the voice communication channel. The data service message can be sent to the data gateway as a standalone packet or it can be sent embedded or concatenated with a data packet. If the data service message is embedded or concatenated with a data packet, the data gateway extracts the data service message and forwards only the data packet to the targeted host. For example, a subscriber unit may construct a data frame by appending a data service message to a data packet (e.g. a license plate look-up request). Upon receiving the data frame, the data gateway removes the data service message and forwards data packet to the target host. As one of average skilled in the art will readily appreciate this is one example of many possible ways in which a communication system can identify a data request from a subscriber unit. Note that the request may also be made over an analog communication channel using sub-audible data signaling or other embedded data signaling technique.

A suitable platform for a data gateway 12 is a personal computer, workstation, or other device that manipulates digital information based on programming instructions and that is capable of providing communications between the communication system 10 and the PSTN, the Internet, or any other public or private communication infrastructure. Upon receiving the subscriber unit's data service message, the data gateway 12 interprets it to determine whether the data service message is for individual data or group data broadcast. If the data service message is for an individual, the data gateway 12 passes data inquiries and data responses between the subscriber unit and the targeted host 22–26 without any modifications to the identity of the subscriber unit.

If, however, the data service message indicates a group data broadcast, i.e., if each of the subscriber units involved in a group communication are to receive the data destined for the requesting subscriber, the data gateway 12 stores the identity of the requesting subscriber unit and the identity of the targeted host. Next, the data gateway 12 provides data requests to the targeted host 22–26, which processes the requests and returns the requested data to the data gateway 12. The returned data includes a header and the data, where the header includes the identity of the host and the identity of the requesting subscriber unit. Upon receiving the requested data, the data gateway 12 reads the header to ascertain the identities of the requesting subscriber unit and the targeted host. When the header information matches the information it has stored in temporary memory (e.g., cache memory), the data gateway replaces the identity of the subscriber unit with a broadcast address and recalculates checksums and or other ancillary values associated with the specific protocols in use. The data gateway 12 then provides the returned data to the group of subscriber units. Note that the broadcast address is an IP address that is recognizable by a group of subscriber units.

The group of subscriber units include a plurality of subscriber units, one of which is the requesting subscriber unit, that are affiliated with each other based on a one-to-many communication occurring over a single communication channel. The group may be pre-established based on functionality of the users (e.g., police officers of a precinct, taxicab drivers, fire department personnel, etc.) or may be established on an ad hoc manner based on the nature of the communication. The group's identity is maintained by the zone controller 14, which may be a personal computer, workstation, or other device that manipulates digital information based on programming instructions. For example, the zone controller 14 may be a zone controller manufactured by Motorola for its ASTRO product line.

As further shown in FIG. 1, site 20 includes a plurality of computers 28, 30, which, for the purposes of this discussion, are considered to be subscriber units. In this regard, the computers request data from the host computers 22–26, via the data gateway 12, in a similar manner as the wireless communication devices of site 16. As such, a computer 28, 30 may initiate a data broadcast that is an individual data broadcast (i.e., unicast) or a group data broadcast. For group data broadcasts, the computer 28, 30 sends a data service message indicating group data broadcast. A subsequent data packet containing a request (or concatenated with the data service message) is sent to the data gateway 12, which processes the data request as previously described. Note that the computers may be grouped based on a functional relationship, such as members of an accounting department, engineering department, etc. Alternatively, the operator of the requesting computer 28, 30 may establish the group. By programming the data gateway 12 to process broadcast group data in the manner just described and as further described below with reference to FIGS. 3 and 4, a subscriber unit can access data without having to leave a group communication, and the data that the subscriber unit retrieves can be provided to the group.

Figure 2:
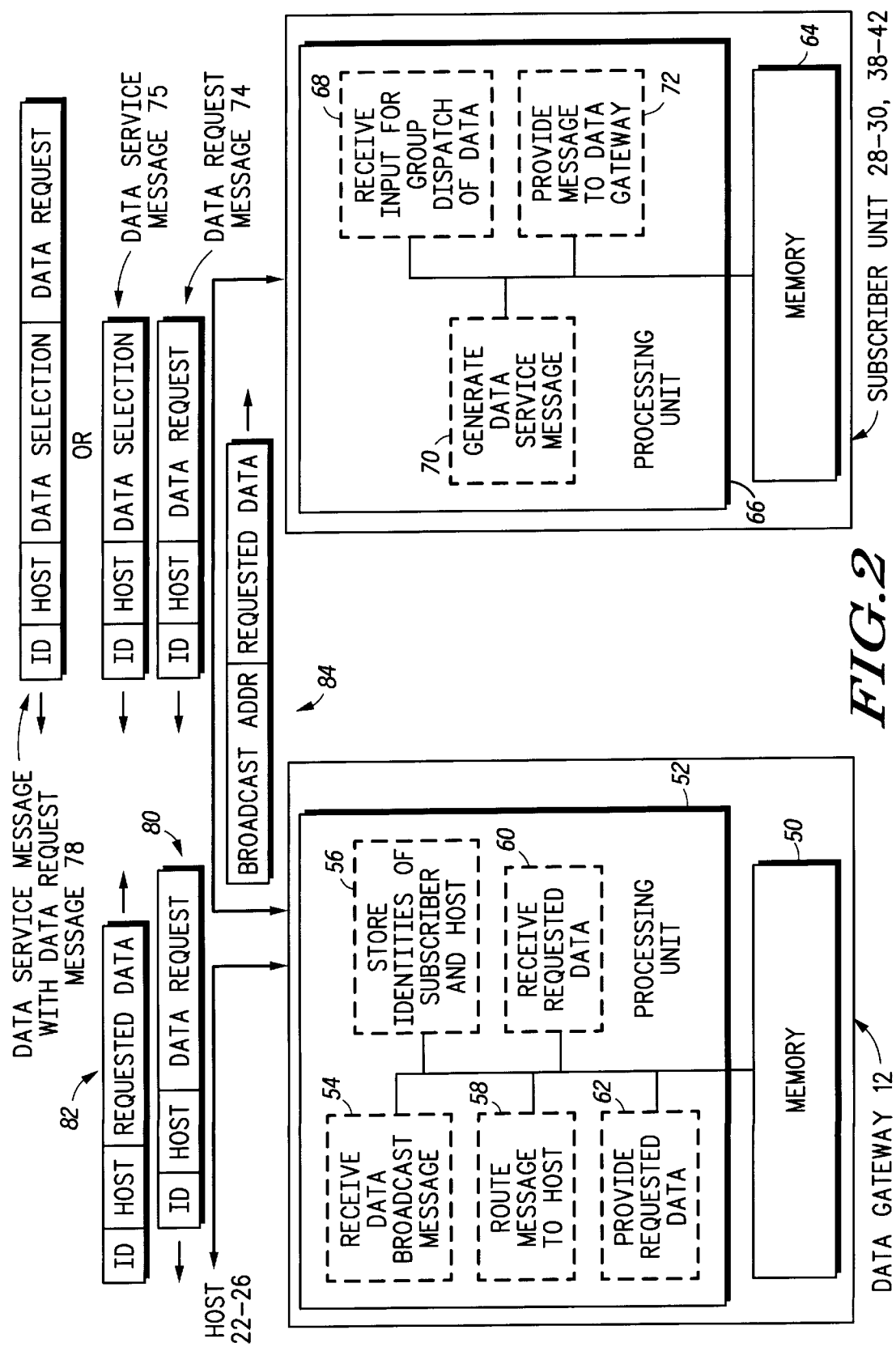
FIG. 2 illustrates a block diagram of a data gateway and subscriber unit in accordance with the present invention.

FIG. 2 illustrates a block diagram of the data gateway 12 and subscriber units 28–30 and 38–42. The data gateway 12 includes a processing unit 52 and memory 50. The memory 50, which may be a read-only memory, random access memory, floppy disk, hard drive, magnetic tape, or any other means for storing digital information, stores programming instructions that, when read by a processing unit, cause the processing unit to function as a plurality of circuits. The processing unit 52, which may be a microprocessor, microcontroller, central processing unit, digital signal processor or any other device that manipulates digital information based on programming instructions, executes the programming instructions stored in memory 50.

While executing the programming instructions stored in memory 50, the processing unit 52 functions as a circuit 54 to receive data service messages. The data service messages 75 and 78 may come in any of at least two forms. The data service message 75 may be fragmented such that the data gateway receives a message indicating that the subscriber unit has selected group data broadcasts from a specific target host, a plurality of targeted hosts, or all of the targeted hosts coupled to the communication system 10. Thus, for any subsequent data request message 74 addressing a targeted host(s), the data gateway broadcasts the data to the group of subscribers on the voice communication channel. The group data broadcast mode may automatically end after each fulfillment of the data request or when the subscriber unit transmits an individual data unicast message to the data gateway 12. Alternatively, the data service message may have the format of the message identified by reference numeral 78 embedded, concatenated, or appended to a data packet (e.g. a data request message 74). In this format, the data service message would include the identity of the subscriber unit, an indication that group data broadcast has been selected, the identity of the host computer, and a data request.

Regardless of the format of the data service message, the processing unit 52 interprets the message to identify the group broadcast request. Having done this, the processing unit 52 functions as a circuit 56 to store the identities of the subscriber unit and the targeted host computer. Having done this, the processing unit 52 then functions as a circuit 58 to route subsequent data requests and responses between the targeted host computer and subscriber unit(s). A message 80 is sent to the targeted host computer that includes the identity of the subscriber unit, the identity of the targeted host and the request for data.

The host computer 22–26, upon receiving and processing the data packet 80 (e.g. request), responds with a data message 82. The data message 82 includes the identity of the subscriber unit, the identity of the targeted host computer, and the requested data. The processing unit 52 then functions as a circuit 60 to receive the requested data from the targeted host computer. Next, the processing unit 52 functions as a circuit 62 to provide the requested data to the group of subscriber units. To do this, the processing unit generates a group message 84 that includes a broadcast identity and the requested data. In other words, the data gateway 12 replaces the individual identity of the subscriber unit with a broadcast address.

The subscriber unit 28–30 and 38–42 include memory 64 and a processing unit 66. The memory 64—which may be a read-only memory, random access memory, floppy disk memory, hard disk memory, or any other means for storing digital information—stores programming instructions that, when executed by a processing unit, cause the processing unit to function as a plurality of circuits. The processing unit 66—which may be a microprocessor, microcontroller, digital signal processor, central processing unit, or any other device that manipulates digital information based on programming instructions—-executes the programming instructions stored in the memory 64 to function as the plurality of circuits.

While executing the programming instructions stored in memory 64, the processing unit 66 functions as a circuit 68 to receive input for data service messages. The input is received from an operator of the subscriber unit via an input mechanism such as a keypad, keyboard, display menu, etc. Next, the processing unit 66 functions as a circuit 70 to generate a data service message 70. The data service message may be generated in the forms described above. Having generated the message, the processing unit 66 then functions as a circuit 72 to provide the message to the data gateway. Note that the interoperable functionality of circuits 54–62 of the processing unit 52 of data gateway 12 and the circuits 68–72 of the processing unit 66 of the subscriber units 28, 30, 38–42 will be described in greater detail with reference to FIGS. 3 and 4.

Figure 3:
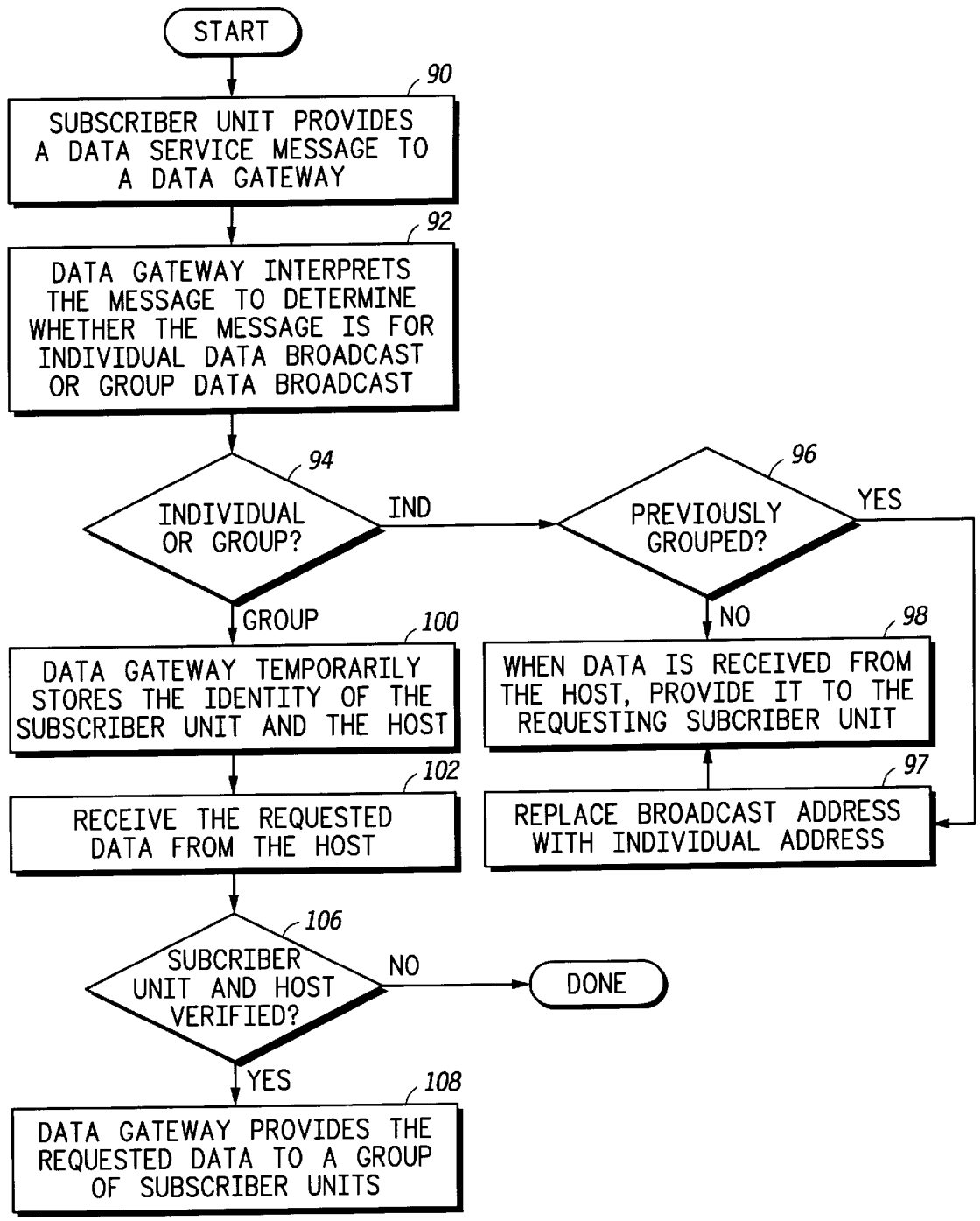
FIG. 3 illustrates a flow chart of a method for providing group data broadcasts in accordance with the present invention.

FIG. 3 illustrates a flow chart of a method for providing broadcast group data. The process begins at step 90 where a subscriber unit provides a data service message to a data gateway. This was previously discussed with reference to FIG. 2. The process then proceeds to step 92 where the data gateway interprets the message to determine whether the message is for an individual data broadcast (i.e., a unicast) or a group data broadcast. At step 94, the flow of the process proceeds to step 96 when the message is for a unicast, and proceeds to step 100 when the message is for a group data broadcast. At step 96, the data gateway determines if the previous mode for the subscriber Host pair was group broadcast. If so, step 97 is invoked to update the data gateway memory to reflect the unicast selection. The process then proceeds to step 98 where, after the data is received from the targeted host, the data gateway provides the data to the requesting subscriber unit in accordance with well-known transmission techniques.

When group data broadcast is selected, the data gateway temporarily stores (e.g., in cache memory) the identities of the subscriber unit and the targeted host at step 100. The process then proceeds to step 102 where the data gateway receives data from the targeted host. Note that to receive the data, the data gateway had to previously provide a representation of the request message to the targeted host computer, where the representation includes, at least, the identity of the subscriber unit and the data request. The process then proceeds to step 106 where a determination is made as to whether the targeted host and subscriber unit are verified. To verify the host and subscriber unit, the data gateway compares the identities of the host and subscriber unit contained within the received data with the identities of the host and subscriber unit stored in its cache memory. If the host or the subscriber unit is not verified, the process is complete for this particular data session. This process of verification prevents unsolicited data from being broadcast.

If, however, the host and subscriber unit are verified, the process proceeds to step 108 where the data gateway provides the data to a group of subscriber units over the communication channel that is currently supporting the group voice communication. Providing the data to the group is done by replacing the identity of the subscriber unit with the identity of the group (i.e. broadcast address) prior to the transmission. For example, the IP address of the subscriber unit would be replaced with a generic IP address for all subscriber units. As such, any subscriber unit involved in the group communication will receive the data.

Figure 4:
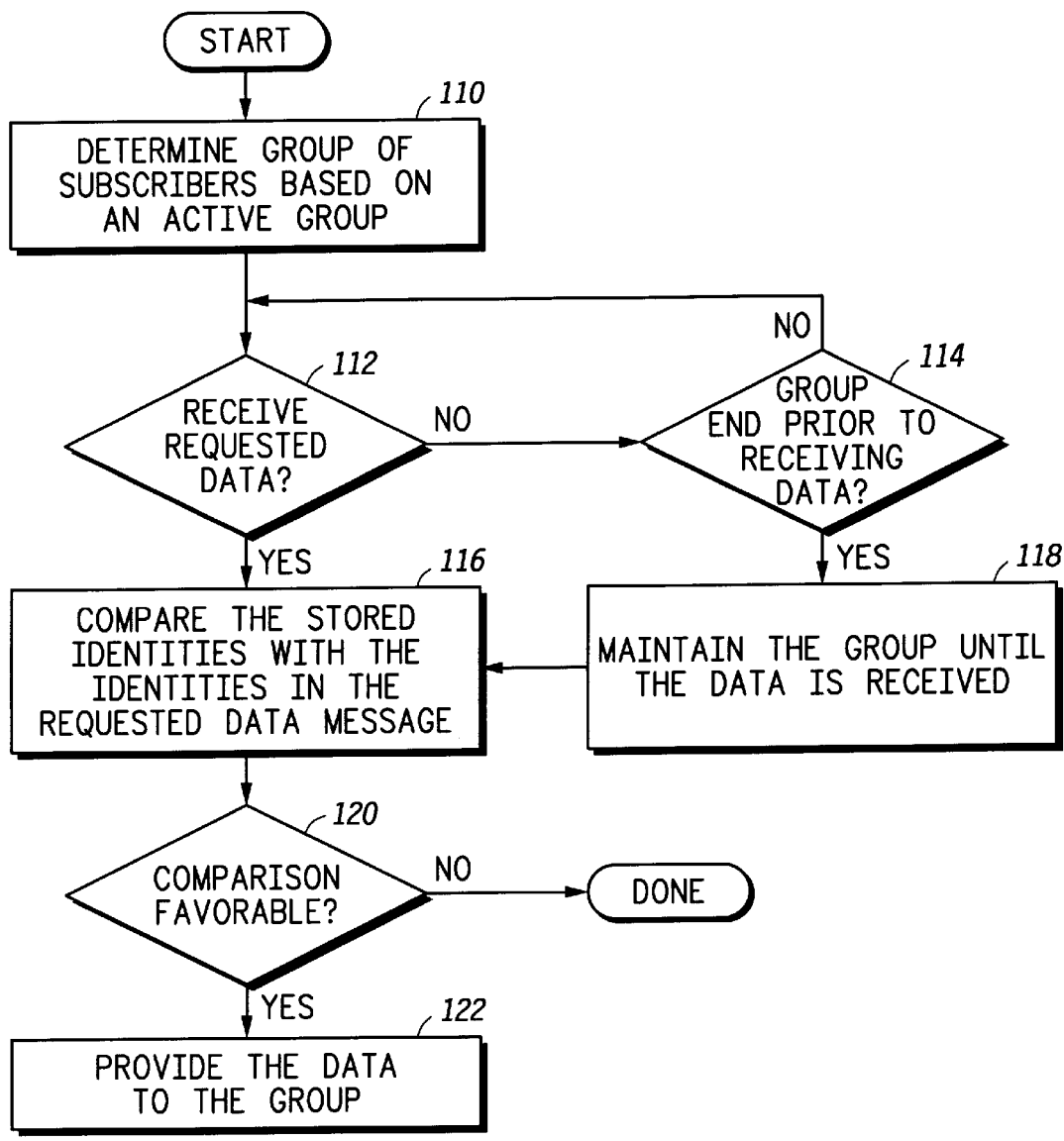
FIG. 4 illustrates a flow chart of a method for maintaining group data broadcasts in accordance with the present invention.

FIG. 4 illustrates a flow chart of a method for further processing broadcast group data. The process begins at step 110 where a group of subscriber units is determined based on an active group call. As previously mentioned, a subscriber unit may be involved in a voice communication with its group, where the group is pre-established based on commonality of function or the group may be selected by the subscriber unit. Regardless of how the group is established, the process proceeds to step 112. At step 112, a determination is made by the data gateway as to whether the requested data has been received. Note that this step assumes that steps 90 through 100 of FIG. 3 have been executed.

If the data has not yet been received, the process proceeds to step 114 where a determination is made as to whether the group maybe disbanding prior to receiving the data (i.e., the group has begun to end the group call and relinquishing the voice communication channel). If this condition exists the process proceeds to step 118, where the data gateway and or the zone controller maintains the group until the data is received.

Once the data is received, the process proceeds to step 116 where the data gateway compares the stored identities of the subscriber unit and the targeted host with the identities of the subscriber unit and targeted host contained within the requested data message. The process then proceeds to step 120 where a determination is made as to whether the comparison was favorable. A favorable comparison would indicate that the identities temporarily stored in cache memory substantially match the identities contained within the message. If the comparison was not favorable, the process is complete for this particular data request. If, however, the comparison was favorable, the process proceeds to step 122 where the data is provided to the group of subscriber units.

The preceding discussion has presented a method and apparatus for providing broadcast group data in a communications system. Such a method and apparatus have particular application in a digital wireless communication system where a subscriber unit no longer has to de-affiliate from a group communication to retrieve data, nor will the requested data only be made available to the requesting subscriber unit. In accordance with the present invention, the data gateway processes data requests from subscriber units such that the data is distributed as requested by the subscriber unit. Such distribution may be to the subscriber unit only or to a group of subscriber units.

Although the present invention has been described with reference to certain preferred embodiments, numerous modifications and variations can be made by those skilled in the art without departing from the novel spirit and scope of the present invention.

I claim:

1. A method for providing broadcast group data, the method comprising the steps of:
   providing, by a subscriber unit, a data service message to a data gateway, wherein the data service message includes identity of the subscriber unit and identity of at least one targeted host;
   determining, by the data gateway, that the data service message is for group data broadcast;
   when the data service message is for the group data broadcast, temporarily storing, by the data gateway, the identity of the subscriber unit and the identity of the at least one targeted host;
   receiving, by the data gateway, data from a targeted host of the at least one targeted host, wherein the data includes the identity of the subscriber unit and the identity of the targeted host;
   comparing the identities of the subscriber unit and the targeted host contained in the data with the identities of the subscriber unit and targeted host that are temporarily stored;
   when the comparing is favorable, replacing the identity of the subscriber unit with a broadcast address; and
   when the identity of the targeted host is verified, providing, by the data gateway, the data to a group of subscriber units, wherein the subscriber unit is included in the group of subscriber units.

2. The method of claim 1, wherein the data service message further includes an identity of all targeted hosts operably coupled to a communication system to which the group of subscriber units is affiliated.

3. The method of claim 1, wherein the data service message includes an Internet protocol address as the identity of the subscriber unit.

4. The method of claim 1, wherein the data service message further includes a data request that requests data from the targeted host, and wherein the method further comprises the step of receiving, by the data gateway, the data from the targeted host in response to the data request.

5. The method of claim 1, wherein the method further comprises the steps of:
   providing a data request subsequent to providing the data service message, wherein the data request identifies the targeted host; and
   receiving, by the data gateway, the data from the targeted host in response to the data request.

6. The method of claim 1, further comprising the steps of:
   determining the group of subscriber units based on an active group communication; and
   when the active group communication would end prior to receiving the requested data, maintaining the group of subscriber units until the requested data is received.

7. A method for a data gateway to process broadcast group data, the method comprising the steps of:
   receiving a data service message from a subscriber unit, wherein the data service message includes an identity of the subscriber unit and identity of a targeted host;
   temporarily storing the identity of the subscriber unit and the identity of the targeted host when the data service message is for a group data broadcast;
   routing, on behalf of the subscriber unit, a data request message toward the targeted host;
   receiving data from the targeted host, wherein the data includes the identity of the subscriber unit and the identity of the targeted host;
   comparing the identities of the subscriber unit and the targeted host contained in the data with the identities of the subscriber unit and targeted host that are temporarily stored;
   when the comparing is favorable, replacing the identity of the subscriber unit with a broadcast address; and
   when the identity of the targeted host is verified, providing the data to a group of subscriber units, wherein the group of subscriber units includes the subscriber unit.

8. The method of claim 7, further comprising the step of receiving the data service message and the data request message contemporaneously.

9. The method of claim 7, further comprising the step of receiving the data request message subsequent to receiving the data service message.

10. A data gateway comprising:
    a processing unit; and
    memory that stores programming instructions that, when read by the processing unit, causes the processing unit to function to: receive a data service message from a subscriber unit, wherein the data service message includes an identity of the subscriber unit and an identity of a targeted host; store the identity of the subscriber unit and the identity of the targeted host when the data service message is for a group data broadcast; route a data request message to the targeted host; receive data from the targeted host, wherein the data includes the identity of the subscriber unit and the identity of the targeted host; compare the identities of the subscriber unit and the targeted host contained in the data with the identities of the subscriber unit and targeted host that are temporarily stored; when the comparing is favorable, replace the identity of the subscriber unit with a broadcast address; and provide the data to a group of subscriber units, wherein the group of subscriber units includes the subscriber unit when the identity of the targeted host is verified.

11. The data gateway of claim 10, wherein the memory further comprises programming instructions that, when read by the processing unit, causes the processing unit to function to:

receive the data service message that includes the data request message; and separate the data request message from the data service message.

12. A method for providing broadcast group data, the method comprising the steps of:

provinding, by a subscriber unit, a data service message to a data gateway, wherein the data service message includes identity of the subscriber unit and identity of at least one targeted host;

determining, by the data gateway, that the data service message is for group data broadcast;

when the data service message is for the group data broadcast, temporarily storing, by the data gateway, the identity of the subscriber unit and the identity of the at least one targeted host;

receiving, by the data gateway, data from a targeted host of the at least one targeted host;

determining a group of subscriber units based on an active group communication, wherein the subscriber unit is included in the group of subscriber units;

when the identity of the targeted host is verified, providing, by the data gateway, the data to a group of subscriber units; and when the active group communication would end prior to receiving the requested data, maintaining the group of subscriber units until the requested data is received.

13. The method of claim 12, wherein the data service message further includes an identity of all targeted hosts operably coupled to a communication system to which the group of subscriber units is affiliated.

14. The method of claim 12, wherein the data includes the identity of the subscriber unit and the identity of the targeted host and the method further comprises the steps of:

comparing the identities of the subscriber unit and the targeted host contained in the data with the identities of the subscriber unit and targeted host that are temporarily stored;

when the comparing is favorable, replacing the identity of the subscriber unit with a broadcast address.

15. The method of claim 12, wherein the data service message includes an Internet protocol address as the identity of the subscriber unit.

16. The method of claim 12, wherein the data service message further includes a data request that requests data from the targeted host, and wherein the method further comprises the step of receiving, by the data gateway, the data from the targeted host in response to the data request.

17. The method of claim 12, wherein the method further comprises the steps of:

providing a data request subsequent to providing the data service message, wherein the data request identifies the targeted host; and receiving, by the data gateway, the data from the targeted host in response to the data request.

* * * * *